US009146894B2

(12) United States Patent
Piepgrass et al.

(10) Patent No.: US 9,146,894 B2
(45) Date of Patent: Sep. 29, 2015

(54) OBJECTIVE VALUE MODELS FOR ENTITY RECOMMENDATION

(71) Applicant: Facebook, Inc., Menlo Park, CA (US)

(72) Inventors: Brian Piepgrass, Redwood City, CA (US); Deeptanshu Verma, Sunnyvale, CA (US); Tony Hsien-yu Liu, San Francisco, CA (US); Ashish Yadav, Mountain View, CA (US); Julia Lee, Los Altos, CA (US)

(73) Assignee: FACEBOOK, INC., Menlo Park, CA (US)

( * ) Notice: Subject to any disclaimer, the term of this patent is extended or adjusted under 35 U.S.C. 154(b) by 81 days.

(21) Appl. No.: 13/962,821

(22) Filed: Aug. 8, 2013

(65) Prior Publication Data

US 2015/0046528 A1 Feb. 12, 2015

(51) Int. Cl.
*G06F 15/16* (2006.01)
*G06F 15/173* (2006.01)

(52) U.S. Cl.
CPC ............................. *G06F 15/17306* (2013.01)

(58) Field of Classification Search
USPC .......... 709/204, 206, 200, 224; 707/723, 728, 707/731, 748–751; 705/319, 7.39
See application file for complete search history.

(56) References Cited

U.S. PATENT DOCUMENTS

| 2013/0211883 | A1* | 8/2013 | Vesely et al. ................. 705/7.39 |
| 2013/0318180 | A1* | 11/2013 | Amin et al. ................... 709/206 |
| 2014/0172875 | A1* | 6/2014 | Rubinstein et al. ........... 707/748 |
| 2014/0372329 | A1* | 12/2014 | Menon et al. ................. 705/319 |

* cited by examiner

*Primary Examiner* — El Hadji Sall
(74) *Attorney, Agent, or Firm* — Nicholson De Vos Webster & Elliot LLP

(57) ABSTRACT

A method for making entity recommendations to users of a social networking system (SNS) by maximizing a predicted benefit to the SNS through objective value models. The method includes generating a plurality of candidate entities eligible for recommendation, and determining a weight for each candidate entity based upon an output score generated by an objective value model. The objective value model utilizes objectively measurable input values describing the candidate entities and generates larger output scores for those candidate entities that would create larger predicted increases in an objectively measurable amount of benefit for the SNS created by a potential connection being created between the user and the respective candidate entity. One or more entities are selected based upon the determined weights, and an entity recommendation user interface is presented to the user that includes one or more recommendation modules identifying the selected one or more entities.

20 Claims, 9 Drawing Sheets

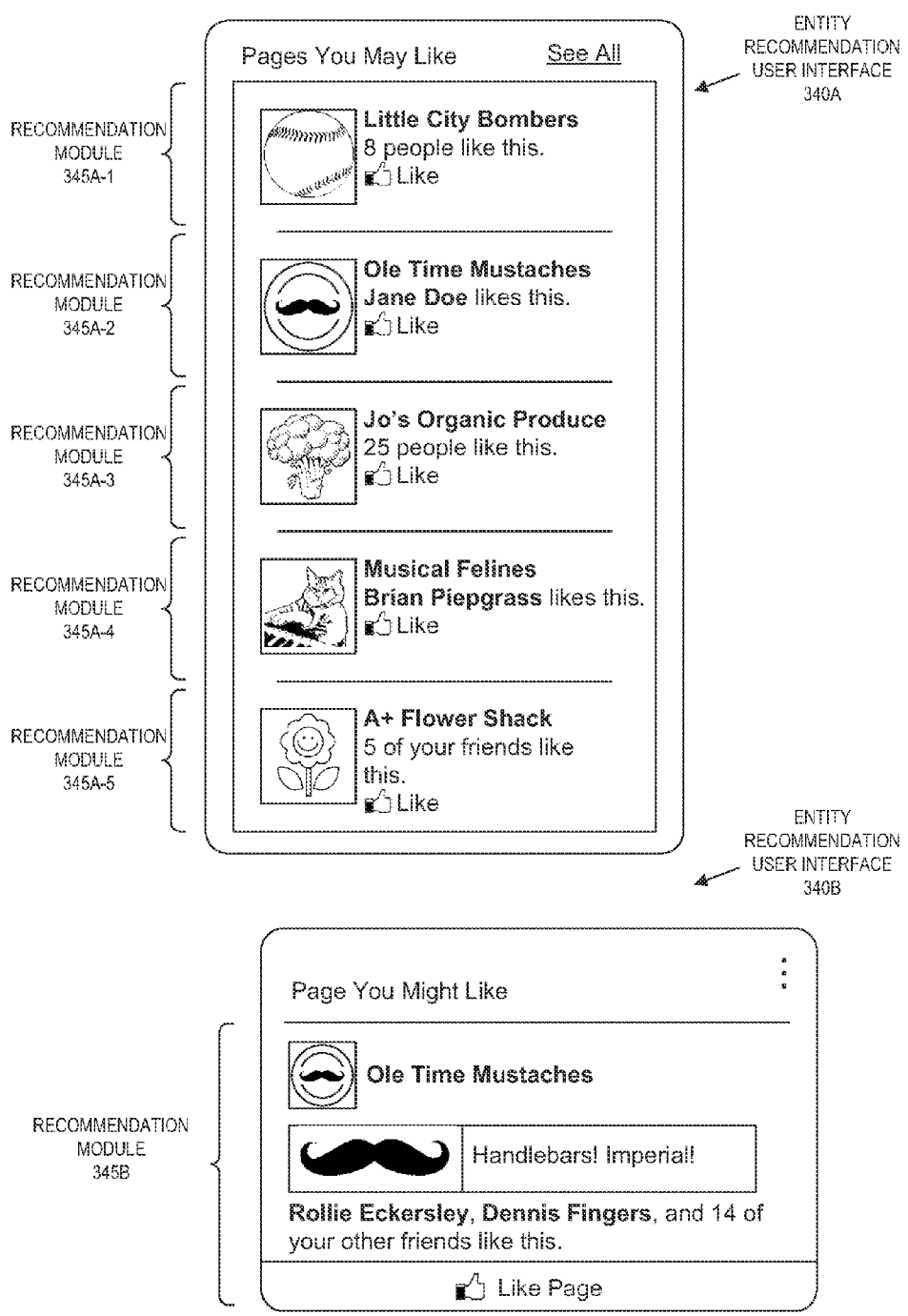

OBJECTIVE VALUE MODELS FOR ENTITY RECOMMENDATION

FIELD

Embodiments of the invention relate to social networking; and more specifically, to making entity recommendations to users of a social networking system based upon maximizing a predicted benefit to the social networking system.

BACKGROUND

In addition to connecting users to other individuals, users of social networking services may also form connections, associations, or other relationships with non-individual entities. For example, users may choose to connect with a neighborhood restaurant, a musical group, or a non-profit organization. Social networking systems value these user-to-entity connections because better-connected entities tend to use the social networking system more, thus providing a more robust social network with more content, increased user-engagement, and increased advertising opportunities. Accordingly, it is generally desirable that users have opportunities to increase the strength and numbers of their connections to entities within social networking systems.

However, it is a common challenge for users to locate entities with which they might desire to form a connection. Existing social networking systems provide limited mechanisms for finding such entities. In some instances, users must perform searches for entities using keywords or may browse a list of entities. In other instances, social networking systems provide individuals with access to an introduction mechanism. The introduction mechanism may be as simple as presenting information describing one or more entities that are in a similar geographic location as the user, liked by the friends of the user, or simply those entities that are liked by the most users throughout the social networking system.

BRIEF DESCRIPTION OF THE DRAWINGS

The invention may best be understood by referring to the following description and accompanying drawings that are used to illustrate embodiments of the invention. In the drawings:

FIG. 5 illustrates entity recommendation user interfaces according to an embodiment of the invention;

DESCRIPTION OF EMBODIMENTS

Figure 1:
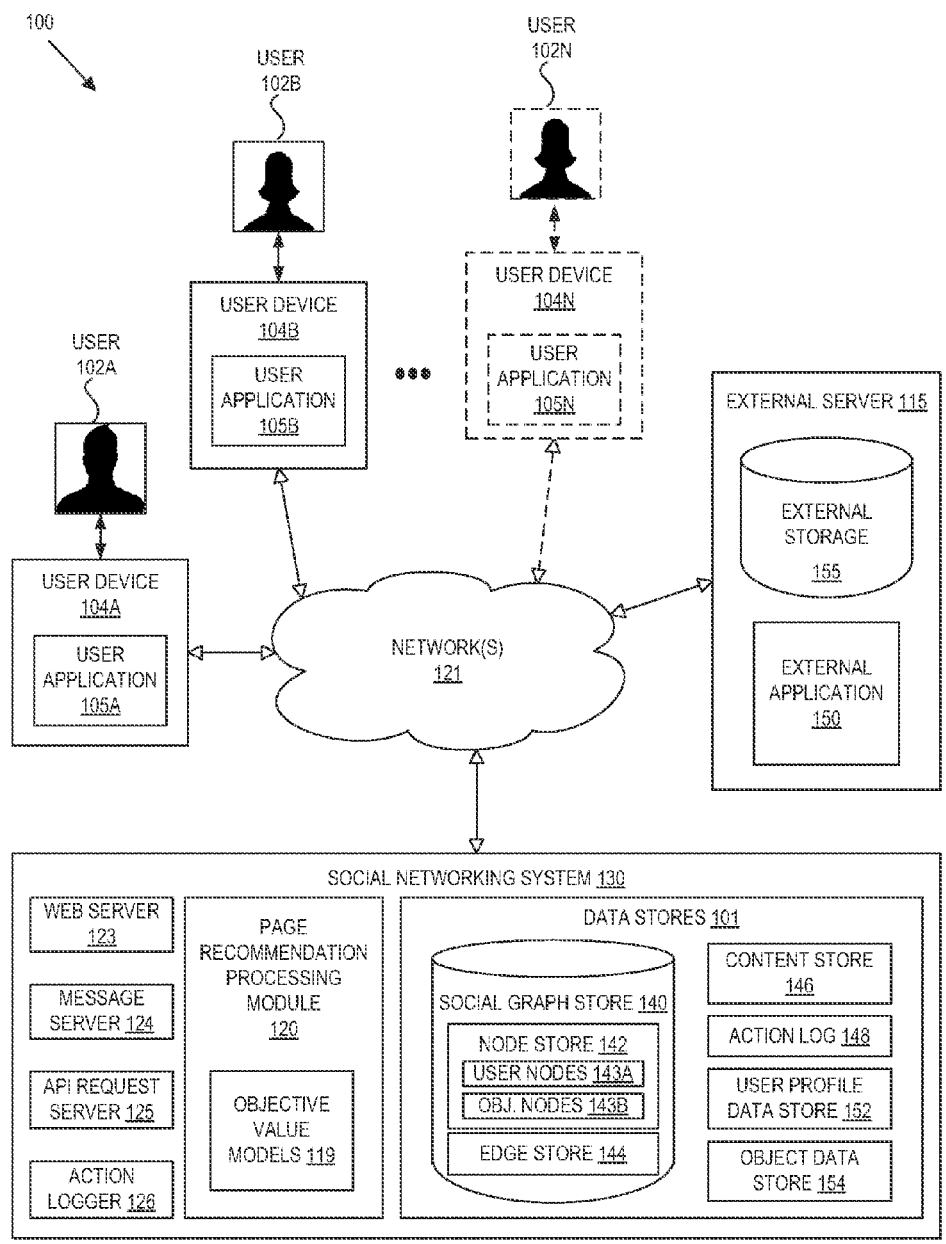
FIG. 1 illustrates an example network environment of a system including a social networking system that offers its users the ability to communicate and interact with other users and entities of the social networking system according to an embodiment of the invention.

In the following description, numerous specific details are set forth. However, it is understood that embodiments of the invention may be practiced without these specific details. References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Many social networking systems provide users the ability to interact with non-individual entities. An entity is a person, place, or thing that can be represented in the social networking system but that is not a personal account of a user of the social networking system. For example, an entity may be, by way of example and not limitation, a business, brand, organization, governmental unit, charity, celebrity, manufacturer, group, fictional character, university, school, city, restaurant, etc. Entities are typically "managed" or represented in the social networking system by one or more individual users called administrators. Entities often have a page in the social networking system where the administrators and/or users can interact.

While social networking systems often provide mechanisms for suggesting entity connections to its users, these mechanisms often have significant shortcomings For example, one mechanism for suggesting connections within social networking systems includes finding users having similar interests, profile characteristics, or connections with a first user. Upon identifying these similar users, the social networking system can recommend connections to entities that the similar users have but that the first user does not have. Another mechanism for suggesting connections to entities in social networking systems includes recommending those entities having the most entity-to-user connections in the social networking system, or those entities that have created the most entity-to-user connections in the social networking system over a recent period of time. However, a common drawback to these mechanisms is that this system will likely be skewed toward making more suggestions for entities that already have many connections, as opposed to making suggestions for entities having few connections within the social networking system. This leads to a sub-optimal result for the social networking system, as an additional "fan" for an entity with many fans is less valuable (to the entity and the social networking system) than an additional fan for an entity with relatively few fans. Other traditional mechanisms for suggesting connections focus on simply adding connections between users and entities without regard to the result of the suggested connections. Accordingly, existing mechanisms that suggest new connections to entities for a user based merely on indicators of a likely connection fail to address the value of the resulting connections to the social networking system.

In contrast, various embodiments of the present invention provide systems and methods for suggesting connections to entities based upon the benefit, to the social networking system and/or to the entity, of providing a recommendation to that entity. These recommendations may be based upon an application of an objective value model to a set of candidate entities to determine those entities that, if recommended to a user and a connection between the user and the entity is ultimately created, will result in a largest predicted benefit to the social networking system, such as an increase in engagement/activity of the entity within the social networking system or an increase in advertising by the entity within the social networking system. Detailed below are embodiments of methods, apparatuses, systems, and user interfaces for making entity recommendations to users of the social networking system based upon maximizing a predicted benefit to the social networking system through objective value models.

FIG. 1 illustrates an example network environment of a system 100 including a social networking system 130 that offers its users 102A-102N the ability to communicate and interact with other users 102A-102N and entities of the social networking system 130 according to an embodiment of the invention. The illustrated social networking system 130 includes a page recommendation processing module 120 for utilizing (and optionally, constructing) objective value models 119 to be used for recommending pages to users 102A-102N in accordance with an embodiment of the invention.

In some embodiments, the social networking system 130 comprises one or more computing devices storing user profiles associated with users 102A-102N and/or other objects, as well as connections between users and other users 102A-102N and/or objects.

The user devices 104A-104N that are enabled to interact with social networking system 130 can be any type of computing device capable of receiving user input as well as transmitting and/or receiving data via a network. For example, the user devices 104A-104N can include conventional computer systems, such as a desktop or laptop computer, or may include devices having computer functionalities such as Personal Digital Assistants (PDA), cellular or mobile telephones, smart-phones, in- or out-of-car navigation systems, gaming devices, or other electronic devices.

In one embodiment, a user device (e.g. 104A) may execute a user application (e.g. 105A) allowing a user 102A of the user device 104A to interact with the social networking system 130. For example, the user application 105A may be a web browser application (e.g., Microsoft Windows Internet Explorer, Mozilla Firefox, Apple Safari, Google Chrome, Opera, etc.). In an embodiment, the user application 105A is a special-purpose client application (e.g., Facebook for iPhone or iPad, etc.), and in an embodiment the native operating system of the user device 104A, such as IOS® or ANDROID™, may utilize an Application Programming Interface (API) to directly interface with the social networking system 130 through API request server 125.

The user devices 104A-104N are configured to communicate with the social networking system 130 via a network 121 or collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network 121 may be wired, wireless, or a combination of both. In one embodiment, the network 121 uses standard communications technologies and/or protocols. Thus, the network 121 may include links using technologies such as Ethernet, Institute of Electrical and Electronics Engineers (IEEE) 802.11, Worldwide Interoperability for Microwave Access (WiMAX), 3G, 4G, Long Term Evolution (LTE), Code-Division Multiple Access (CDMA), Digital Subscriber Line (DSL), cable modems, etc. Similarly, the networking protocols used on the network 121 may include Multiprotocol Label Switching (MPLS), Transmission Control Protocol (TCP), Internet Protocol (IP), TCP/IP, User Datagram Protocol (UDP), Hypertext Transport Protocol (HTTP), Simple Mail Transfer Protocol (SMTP), and/or File Transfer Protocol (FTP). Data exchanged over the network 121 may be represented using technologies and/or formats including Hypertext Markup Language (HTML) or Extensible Markup Language (XML), among other formats. In addition, all or some of links can be encrypted using conventional encryption technologies such as Secure Sockets Layer (SSL), Transport Layer Security (TLS), or Internet Protocol security (IPsec).

The social networking system 130 fundamentally relies upon information representing its users 102A-102N and a set of objects. Users 102A-102N, using the social networking system 130, may add connections to other users or objects of the social networking system 130 to which they desire to be connected, and may also interact with these other users or objects. The users of the social networking system 130 are individuals (e.g. humans), and the objects may include entities (such as businesses, organizations, universities, manufacturers, brands, celebrities, etc.), concepts, or other non-human things including but not limited to a location, an album, an article, a book, a concept, etc.

In some embodiments, the social networking system 130 also allows users to interact with external (e.g., third-party) applications 150 (e.g., websites), external storage 155, and/or external servers 115.

Based on the stored data about users, objects, and the connections between the users and/or objects, the social networking system 130 generates and maintains a "social graph" in a social graph store 140 comprising a plurality of nodes interconnected by a plurality of edges. Each node in the social graph represents a user or object that can act on another node and/or that can be acted on by another node. An edge between two nodes in the social graph represents a particular kind of connection between the two nodes, which may result from an action that was performed by one of the nodes on the other node. For example, when a user identifies an additional user as a friend, an edge in the social graph is generated connecting a node representing the first user and an additional node representing the additional user. The generated edge has a connection type indicating that the users are friends. As various nodes interact with each other, the social networking system 130 modifies edges connecting the various nodes to reflect the interactions.

To provide these functionalities, the embodiment of the social networking system 130 illustrated in FIG. 1 includes an API request server 125, a web server 123, a message server 124, an action logger 126, a set of data stores 101, and a page recommendation processing module 120. This embodiment also includes, within the data stores 101, a social graph store 140 including a node store 142 and an edge store 144, as well as a content store 146, an action log 148, a user profile data store 152, and an object data store 154. In other embodiments, the social networking system 130 may include additional, fewer, or different modules for various applications. Of course, conventional components such as network interfaces, processors, memories, security mechanisms, load balancers, failover servers, management and network operations consoles, and the like are not shown in FIG. 1 so as to not obscure the details of the system.

The social networking system 130 allows its users 102A-102N to communicate or otherwise interact with each other and access content, as described herein. The social networking system 130 stores user profiles in the user profile data store 152. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. The user profile information stored in user profile data store 152 describes the users 102A-102N of the social networking system 130, including biographic, demographic, and other types of descriptive information, such as work experience, educational history, gender, relationship status, hobbies, location, other preferences, and the like. The user profile may also store information provided by the user. For example, images or videos provided by the user may also be stored within the user profile, though in other embodiments only textual data of the user is stored in the user profile and other data (e.g., images, videos) are stored in multimedia stores and then associated with the user (e.g., through associating a user identifier of the user with an image/video identifier of the multimedia content). In certain embodiments, images or videos including or depicting users of the social networking system 130 may be "tagged" with identification information of those users. A user profile in the user profile data store 152 may also maintain references to actions (stored in the user profile or in an action log 148) by the corresponding user performed on content items in a content store 146 and stored in an edge store 144. A user may also specify one or more privacy settings, which are stored in that user's user profile, which limit information that the social networking system 130 or other users of the social networking system 130 will be permitted to access from that user's user profile.

The web server 123 links the social networking system 130 via the network 121 to one or more user devices 104A-104N, by accepting requests for from the user devices 104A-104N and/or transmitting web pages or other web-related content to the user devices 104A-104N, such as Java, Flash, XML, JavaScript, Cascading Style Sheets (CSS), and so forth. The web server 123 in some embodiments is configured to utilize a set of one or more network interfaces (not illustrated in FIG. 1) to send and receive messages across the network 121, but in some embodiments the web server 123 (additionally or alternately) utilize a message server 124 to communicate with the user devices 104A-104N, which is operative to send and/or receive instant messages, queued messages (e.g., email), text and SMS (Short Message Service) messages, or any other suitable messaging technique. In some embodiments, a message sent by a user to another user by way of the social networking system 130 can be viewed by other users of the social networking system 130, for example, by certain connections of the user (directly connected users in the social graph, other users more than one hop away in the social graph, etc.) receiving the message. An example of a type of message that can be viewed by other users of the social networking system 130 (besides the recipient of the message) is commonly known as a wall post. In some embodiments, a user can send a private message to another user that can only be retrieved by the other user.

When a user takes an action within the social networking system 130, the action may be recorded in an action log 148 by an action logger 126, subject to any privacy settings and restrictions of the user and/or social networking system 130. In one embodiment, the social networking system 130 maintains the action log 148 as a database of entries. When an action is taken on the social networking system 130, the social networking system 130 can add an entry for that action to the action log 148. In accordance with various embodiments, the action logger 126 is capable of receiving communications from the web server 123 about user actions on and/or off the social networking system 130. The action logger 126 populates the action log 148 with information about those user actions. This information may be subject to privacy settings associated with the user. Any action that a particular user takes with respect to another user is associated with each user's profile, through information maintained in a database or other data repository, such as the action log 148. Examples of actions taken in the social networking system 130 that may be stored in the action log 148 may include, but are not limited to, adding a connection to another other user, sending a message to the other user, reading a message from the other user, viewing content (e.g., wall posts, images, videos) associated with or created by the other user, attending an event posted by another user, being tagged in photos with another user, etc. In some embodiments, certain actions are described in connection with more than one user, and these actions may be associated with those users as well and stored in the action log 148.

The action log 148 may be used by the social networking system 130 to track other user actions on the social networking system 130, as well as actions on an external application 150 (e.g., website) that are communicated to the social networking system 130. Users may interact with various objects on the social networking system 130, including commenting on posts, sharing links, and checking-in to physical locations via a mobile device, accessing content items in a sequence or other interactions. Information describing these actions is stored in the action log 148. Additional examples of interactions with objects on the social networking system 130 included in the action log 148 include logging in to the social networking system 130, commenting on a photo album, communications between users, becoming a fan of a musician or brand by "liking" a page of the respective entity, adding an event to a calendar, joining a group, creating an event, authorizing an application, using an application, and engaging in a transaction. Additionally, the action log 148 records a user's interactions with advertisements on the social networking system 130 as well as other applications operating on the social networking system 130. In some embodiments, data from the action log 148 is used to infer interests or preferences of the user, augmenting the interests included in the user profile and allowing a more complete understanding of user preferences.

The API request server 125 allows external systems (e.g., external server 115, and/or user devices 104A-104N) to access information from the social networking system 130 by issuing API calls. The information provided by the social networking system 130 may include user profile information or the connection information of users, subject to the individual privacy settings of the user. For example, a system (e.g. external application 150) interested in predicting the probability of users forming a connection within a social networking system may send an API request to the social networking system 130 via the network 121. The API request is received at the social networking system 130 by the API request server 125, which then processes the request by determining an appropriate response and transmits the response back to the requesting application 150 via the network 121.

The content store 146 stores content items associated with user profiles, such as images, videos, and/or audio files. Content items from the content store 146 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users or entities, to invite new users to the system or to increase interaction with the social network system 130 by displaying content related to users, objects, activities, or functionalities of the social networking system 130. Examples of social networking content items include suggested connections or suggestions to perform other actions, media provided to or maintained by the social networking system 130 (e.g., pictures, videos), status messages or links posted by users to the social networking system, events, groups, pages (e.g., representing an organization or commercial entity), and any other content provided by, or accessible via, the social networking system 130.

The content store 146 also includes one or more pages associated with entities included in the set of object nodes 143B within the social graph store 140. An entity is a type of object that can be a non-individual user of the social networking system 130, such as a business, a vendor, an organization, or a university. However, in some embodiments of the invention an entity may represent a celebrity or other well-known individual, and thus an entity object node for a person may exist in the social graph (serving as a "brand" for that individual, and perhaps having an associated page that other users may "like") and also a user node for that same person may also exist in the social graph (serving as a representation for a personal account of that person). A page includes content associated with an entity and instructions for presenting the content to a user of the social networking system 130. For example, a page identifies content associated with the entity's stored content (from the object data store 154) as well as information describing how to present the content to users viewing the page.

In one embodiment, the social graph store 140 includes a node store 142 and an edge store 144. The node store 142, in some embodiments, includes one entry (or user node) for each user in a set of user nodes 143A and one entry (or object node) for each object in a set of object nodes 143B. Each entry in the node store 142 may include a node identifier (e.g., a user identifier and/or object identifier) and may optionally also include some or all of the data described herein as stored in the user profile data store 152 or object data store 154. The edge store 144 stores the information describing connections between users and other objects on the social networking system 130 as edge objects. Some edges may be defined by users, allowing users to specify their relationships with other users or objects. For example, users may generate edges with other users that parallel the users' real-life relationships, such as friends, co-workers, partners, and so forth. Other edges are generated when users interact with objects in the social networking system 130, such as expressing interest in a page on the social networking system, sharing a link with other users of the social networking system, or commenting on posts made by other users of the social networking system. The edge store 144 stores edge objects that include information about the edge, such as affinity scores for objects, interests, and other users. Affinity scores may be computed by the social networking system 130 over time to approximate a user's affinity for an object, interest, and other users in the social networking system 130 based on the actions performed by the user. In an embodiment, multiple interactions between a user and a specific object are stored in one edge object in the edge store 144. In some embodiments, connections between users may be stored in the user profile data store 152, or the user profile data store 152 may access the edge store 144 to determine connections between users.

Figure 2:
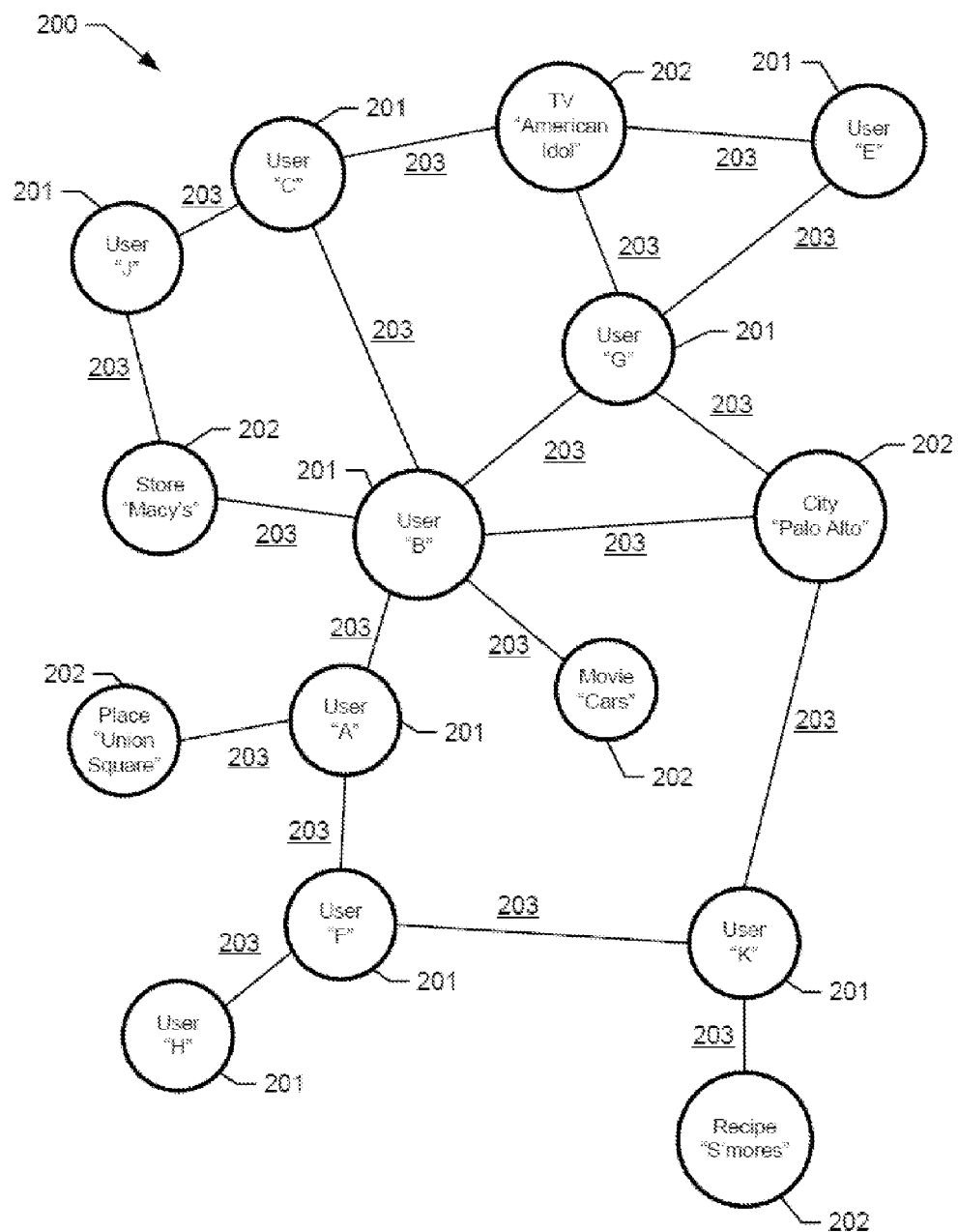
FIG. 2 illustrates an example of a social graph comprising a plurality of user nodes and a plurality of object nodes according to an embodiment of the invention.

FIG. 2 illustrates an example of a social graph 200 comprising a plurality of user nodes and a plurality of object nodes according to an embodiment of the invention. A user node of the social graph, in some embodiments, corresponds to a user of the social networking system. A user node corresponding to a user may comprise information provided by the user and information gathered by various systems, including the social networking system 130. For example, the user may provide his or her name, profile picture, city of residence, contact information, birth date, gender, marital status, family status, employment, educational background, preferences, interests, and other demographic information to be included in or referenced by the user node. Each user node of the social graph may have a corresponding web page (typically known as a "profile page"), which may include a "timeline" of content related to the user displayed according to a time associated with the content. This profile page may be generated dynamically (i.e., constructed upon a request for the profile page and discarded thereafter) or statically (i.e., constructed and saved for later requests, and only reconstructed if necessary). For example, in response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

As described above, an object node may correspond to an entity, concept, or other non-human thing including but not limited to an animal, a movie, a song, a sports team, a celebrity, a group, a restaurant, a place, a location, an album, an article, a book, a food, an Internet link, or a music playlist. An object node may have a set of one or more "administrative" users for the object node that are granted permission, by the social networking system 130, to create or update the object node (or a page of the object node) by providing information related to the object (e.g., by filling out an online form), causing the social networking system to associate the information with the object node. For example and without limitation, information associated with an object node can include a name or a title of the object, one or more images (e.g., an image of cover page of a book), a web site (e.g., an URL address), and/or contact information (e.g., a phone number, an email address).

An edge between a pair of nodes represents a relationship between the pair of nodes. For example, an edge between two user nodes can represent a friendship between two users. Additionally, an edge may have an associated "label" or "action", which describes the relationship between the nodes. For example, an edge between a user and an object node representing a city may have a label indicating that the user "lives" in the city, or an edge between a user and an object node representing a book may have an action indicating that the user has "read" the book.

The social networking system 130 may provide a web page (or other structured document) for an object node (e.g., a restaurant, a non-profit organization, a celebrity), incorporating one or more selectable buttons (e.g., "like", "check in") in the web page. A user can access the page using a web browser hosted by the user's user device and select a button within the page, causing the user device to transmit to the social networking system a request to create an edge between a user node of the user and an object node of the object, thereby indicating a relationship between the user and the object (e.g., the user checks in a restaurant, or the user "likes" a celebrity, etc.). For example, a user may provide (or change) his or her city of residence, causing the social networking system to create (and or delete) an edge between a user node corresponding to the user and an object node corresponding to the city declared by the user as his or her city of residence.

A degree of separation between any two nodes may be defined as the minimum number of hops required to traverse the social graph from one node to the other. Other possible definitions may include traversal costs for edges to define separation as the path of minimum cumulative cost between nodes. A degree of separation between two nodes can be considered a measure of relatedness between the entities (users or objects) represented by the two nodes in the social graph.

In the example of FIG. 2, social graph 200 may include user nodes 201, object nodes 202, and edges 203 between nodes. An edge 203 between a pair of nodes may represent a relationship (or an action) between the pair of nodes. For example, user "G" is a friend of user "B", user "C", and user "E", respectively, as illustrated by the edges between user nodes "G" and "B", between user nodes "G" and "C", and between user nodes "G" and "E." For example, users "C", "E", and G" watch (or "like") TV show "American Idol", as illustrated by the edges between the "American Idol" object node and user nodes "C", "E", and G", respectively. Similarly, the edge between the user node "B" and the object node "Palo Alto" may indicate that user "B" declares "Palo Alto" as his or her city of residence. The edge between the user node "B" and the object node "Macy's" may indicate that user "B" likes "Macy's." Of course, social graphs can be much larger than social graph 200 illustrated in FIG. 2, and the number of edges and/or nodes in a social graph may be many orders of magnitude larger than that depicted herein.

As described above, an edge between a pair of nodes may indicate a direct relationship between the pair of nodes. More generally, an edge may encode a similarity (factual or hypothesized similarity or affinity between two nodes. An edge may be directed and connect an ordered pair of nodes. For example, an edge connecting a user node corresponding to a user and an object node corresponding to a city may be directed (i.e., the user lives in the city). An edge may be undirected, as a pair of nodes connected by the edge does not have a particular order. For example, an edge connecting two user nodes can be undirected as the edge indicates a friendship between two users corresponding to the two user nodes. It is also desirable to determine a likelihood of a relationship or an interest between a pair of nodes that are two or more hops away. For example, the social networking system 130 may provide (e.g., via an email or a wall-post) a recommendation (e.g., an advertisement) for "Macy's" to user "B", given the direct relationship represented by the edge between the user node "B" and the object node "Macy's" as illustrated in FIG. 2. The social networking system 130 may also provide a recommendation for "Macy's" to first-degree friends of user "B" (e.g., users "C", "G", "A") as first-degree friends often share comment interests. Numeric attributes (height, age/date of birth, etc.) or structured attributes (family relations, preferences, etc.) are usually not represented by nodes in the social graph.

Connections (i.e., edges) may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user," "friend" and "connection" depend on the frame of reference. Connections between users of the social networking system 130 are usually bilateral, or "mutual," but connections may also be unilateral, or "one-way." For example, if Bob and Joe are both users of the social networking system 130 and are connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and objects) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in a third-party website 150, separate from the social networking system 130, coupled to the social networking system 130 via a network 121.

The social networking system 130 also includes user-submitted content, which enhances a user's interactions with the social networking system 130. User-submitted content may include anything a user can add, upload, send, or "post," to the social networking system 130. For example, a user communicates posts to the social networking system 130 from a user device 110. Posts may include data such as status updates or other textual data, location information, photos, videos, links, music or other similar data, content and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 130.

Objective Value Models for Page Recommendation

Figure 3:
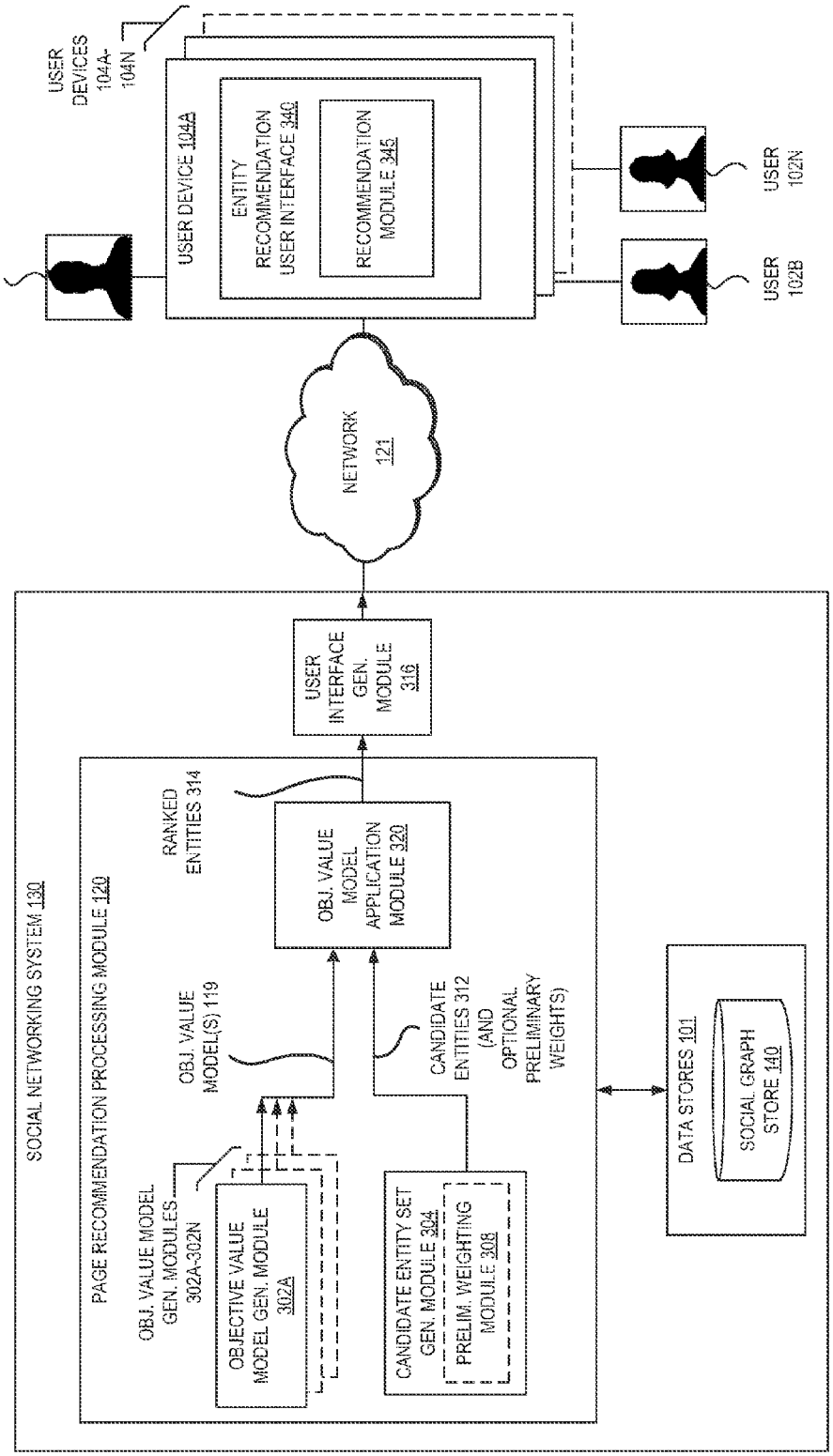
FIG. 3 illustrates a block diagram of a social networking system including a page recommendation processing module employing an objective value module according to an embodiment of the invention.

FIG. 3 illustrates a block diagram of a social networking system 130 including a page recommendation processing module 120 employing objective value models 119 according to an embodiment of the invention. In the depicted embodiment, the page recommendation processing module 120 is configured to determine a ranked set of entities 314 to be recommended to users 102A-102N that are both likely to be found to be interesting by those users and that will also create a maximum predicted increase in benefit (e.g., engagement) to the social networking system 130.

In this depicted embodiment of FIG. 3, the page recommendation processing module 120 includes one or more objective value model generation modules 302A-302N configured to generate objective value models 119 that, along with a set of candidate entities 312 created by a candidate entity set generation module 304, is used by an objective value model module 320 to generate a set of ranked entities 314 that identify which of the candidate entities 312 should be shown to a user (e.g. 102A) to maximize a predicted benefit (e.g., maximized entity engagement) for the social networking system 130.

Each objective value model generation module (e.g., 302A) generates an objective value model 119 based upon data of the social networking system 130 accessed from the data stores 101, which may include social graph data from the social graph store 140, historic data from the action log 148 representing actions of the users 102A-102N, etc. The generated objective value models 119 utilize one or more dimensions of objective data describing the entities (or actions of the entities) in the social networking system 130 and/or describing other interactions occurring with or related to the entities in the social networking system 130 as input values, and generate an output score (i.e., weight, or "boost value") to be used to determine which entities of a plurality of candidate entities should be shown to the users 102A-102N. This boost value represents the value to the social networking system 130 in recommending the entity (or a page of the entity) to the user. In an embodiment of the invention, the boost value indicates a predicted increase in an objectively measurable activity with regard to the entity in the social networking system 130, if the entity is recommended to the user. Each generated objective value model 119 is then provided to the objective value model application module 320, which uses the objective value models 119 to generate an output score for an entity. In one embodiment, the social networking system 130 may provide the user with suggested entity information only when there is at least one candidate entity with an output score greater than a specific threshold value. In some embodiments, only candidate entities with an output score greater than the specific threshold value are ranked. One or more of the candidate entities with the highest ranks (i.e., output scores) are then be displayed to the user as suggested entities that the user may want to connect with in the social networking system 130.

According to an embodiment of the invention, a candidate entity set generation module 304 is configured to, for an individual user (e.g., 102A), generate a plurality of "candidate" entities that could be presented to the user 102A. In various embodiments, this candidate entity set 312 is generated for the user 102A on a determined time schedule (e.g., periodically—such as hourly, daily, weekly, etc.—or at certain defined intervals, such as at midnight, noon, and 6 pm). In other embodiments, the candidate entity set 312 is generated for the user 102A responsive to particular actions taken by the user 102A, such as when the user "logs in" to the social networking system 130, requests a particular page or view such as a "News Feed" view (comprising stories describing occurrences within the social networking system 130, where at least some of the stories describe the user's "friends") or a "profile page" of the user 102A or another user (e.g. user 102B). In some embodiments, the candidate entity set generation module 304 generates candidate entity sets 312 both according to a time schedule and also dynamically ("on demand") in response to a user action or request.

In some embodiments, the candidate entity set generation module 304 generates the set of candidate entities 312 by accessing the data stored within the social networking system's 130 data stores 101. In one embodiment, the candidate entity set generation module 304 generates this set 312 by gathering a set of entities within the social networking system 130 that do not have a connection with the user (i.e., have an edge in the social graph connecting the entity object node with the user node), but that are associated in some way with the user. For example, the candidate entity set generation module 304 may populate a set of candidate entities 312 that are connected to (e.g., "liked" by) a threshold number of the user's friends (i.e., other user nodes that are directly connected to the user node of the user). As another example, the candidate entity set generation module 304 may populate a set of candidate entities that share similar attributes with the user, such as sharing a common city, being located within a distance of an address or geolocation of the user. In an embodiment, the candidate entity set generation module 304 may examine the object nodes that the user already has a connection to within the social networking system 130, and then include in the candidate set of entities additional non-connected entities that are similar to the already-connected-to entities (e.g., having a same category, name, characteristics, etc.). In an embodiment, the candidate entity set generation module 304 will examine the object nodes that the user already has a connection to within the social networking system 130, determine a set of other users that are connected to some or all of those object nodes, and then determine other entity object nodes connected to the set of other users that are not currently connected to the user, and those entities are then included in the set of candidate entities 312.

In some embodiments, the candidate entity set generation module 304 generates a set of candidate entities 312 by first creating a set of candidate users comprising friends of the user and/or friends of the user's friends who also share certain similar characteristics with the user and/or additional users in the social networking system 130 that share similar characteristics with the user. By way of example, the similar characteristics may include, but are not limited to, users sharing a same age, gender, residence location, same or similar college or high school, same or similar graduation year, users checking into the social networking system 130 from the same location at about the same time, etc. In these embodiments, candidate entity set generation module 304 creates a set of entities that are connected to the set of candidate users, and removes from this set of entities any entities that the user is already connected to. This set is included in the set of candidate entities 312. Of course, while several configurations for generating sets of candidate entities 312 are described, in certain embodiments, one configuration or multiple configurations may be used together to generate the candidate entity sets 312.

In an embodiment of the invention, the candidate entity set generation module 304 also includes a preliminary weighting module 308 that is configured to determine, for each entity of the set of candidate entities 312, a preliminary weight indicating which of the candidate entities should be shown to the user 102A. In one embodiment, the preliminary weighting module 308 determines a similarity score between each candidate entity and the user 102A, which becomes the preliminary weight for that candidate entity. In one embodiment, the preliminary weighting module 308 uses historic demographic and behavioral data associated with all user connections within the social networking system 130 (from data stores 101) to determine a preliminary probability (or, a "click through" likelihood or probability) that the user, if shown a particular candidate entity, will form a connection with that entity or view the page of that entity. In other embodiments, the preliminary weighting module 308 is configured to utilize other predictive schemes well known to those of skill in the art to generate the preliminary weights.

The objective value model application engine 320 receives the set of candidate users 312 (and optionally a set of preliminary weights for the candidate users) from the candidate entity set generation module 304, and the objective value model(s) generated by the objective value model generation module(s) 302A-302N. Using this information, and optionally information from data stores 101, the objective value model application engine 320 can determine the value to the social networking system 130 for each potential connection between the user and each candidate entity. In accordance with various embodiments, the value to the social networking system for each entity is called an output score.

The output score is the expected increase in overall engagement of the candidate entity with the social networking system 130 that would result from the connection between the user 102A and the candidate entity. The overall engagement is an objective measure of the involvement or commitment of the entity within the social networking system 130, and can include activities both on and off of the social networking system 130. For example, any activity that can be tied to social plugins, connecting, involvement, and the like can be used as indicators of the entity's engagement. Engagement may also be measured based on activities performed by the candidate entity (e.g., logins, page views, posts, comments, advertising) and/or other users on the social networking system 130 (e.g., "likes" of the entity page, posts or comments made on the entity page, other posts or comments made that mention the entity, views of the entity page, clicks made on the entity page, etc.).

The objective value model application engine 320, according to an embodiment of the invention, outputs a ranked set of candidate entities 314 ranked according to the output scores. The rankings, in some embodiments of the invention, are stored in a ranking database within the data stores 101 and then used by the social networking system 130 to provide suggestions to the user. Embodiments of the user interfaces for making these suggestions are described in greater detail below with reference to FIG. 5 and FIG. 6. The operations of the objective value model generation module 302, according to an embodiment of the invention, are described in greater detail below in reference to FIG. 4A, and the operations of the objective value model application module 320 are described in greater detail below in reference to FIG. 4B.

Objective Value Model Generation

Figure 4A:
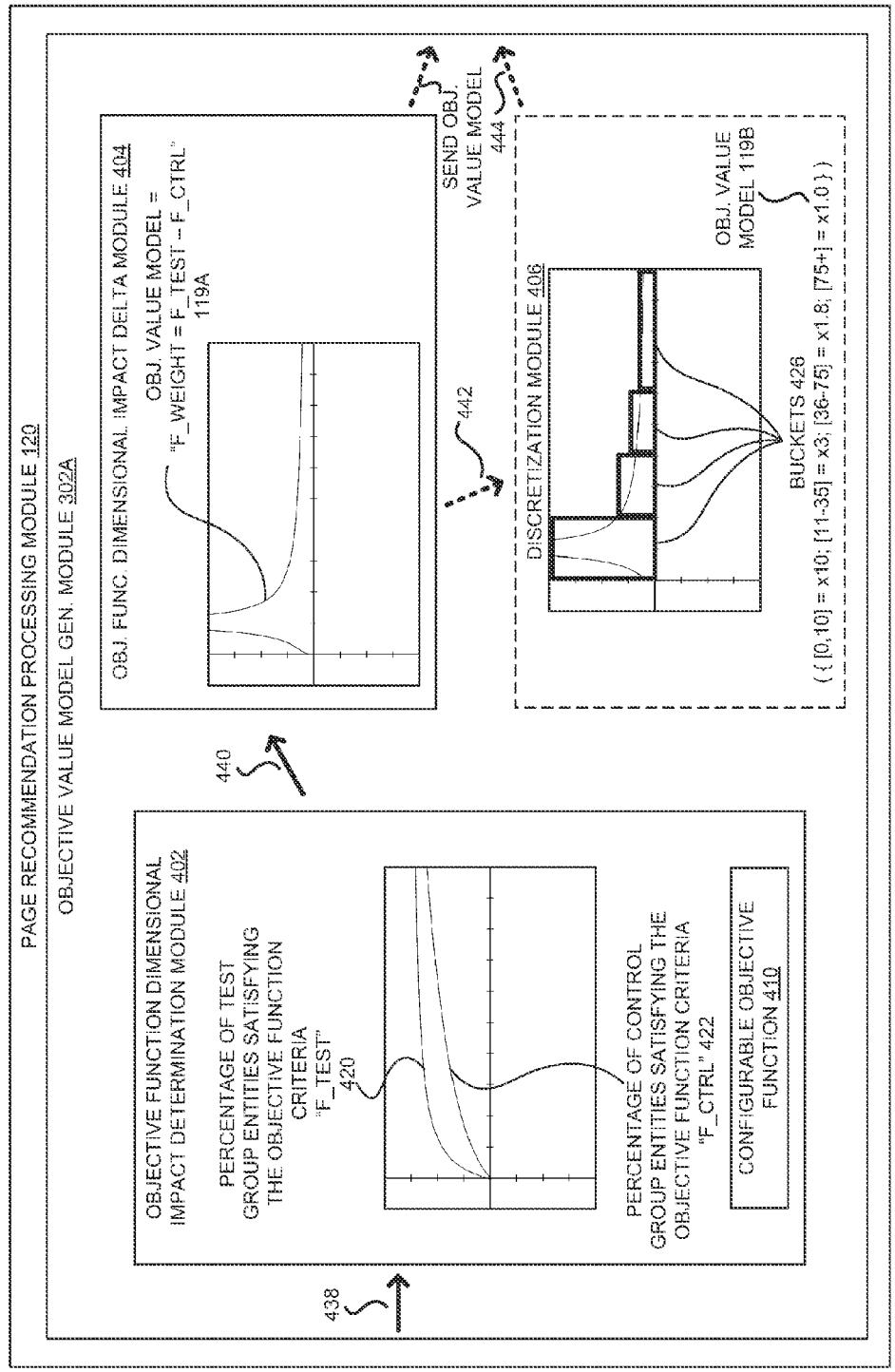
FIG. 4A illustrates a block diagram of a page recommendation processing module for constructing an objective value model according to an embodiment of the invention.

FIG. 4A illustrates a block diagram of a page recommendation processing module 120 for constructing an objective value model 444 according to an embodiment of the invention. In this embodiment, the page recommendation processing module 120 comprises an objective value model generation module 302A including an objective function dimensional impact determination module 402, an objective function dimensional impact delta module 404, and optionally a discretization module 406, although in other embodiments there may be more or fewer modules.

The objective value model generation module 302A is configured to, in the depicted embodiment of FIG. 4A, to analyze historic social networking system data 438 from data store 101 (e.g., data from action log 148, social graph store 140, etc.) to generate and output an objective value model 444 designed to produce output scores that represent an expected increase in overall engagement of a candidate entity within the social networking system 130 that would result from a connection being formed between a user and the candidate entity.

According to an embodiment of the invention, the objective function dimensional impact determination module 402 is configured to instruct the social networking system 130 to divide the some or all of the entities of the social networking system 130 into two primary groups—a control group, and a test group. The entities may be selected for this statistical analysis and/or divided into the two primary groups at random, or may be selected based on characteristics to ensure an appropriate sampling of the set of entities (e.g., number of interactions within a certain period by each entity, number of users that "like" each entity, etc.). In some embodiments, the size of the control group and the test group are approximately equal or equal, but in other embodiments the size of the control group and the test group may be significantly different.

In an embodiment where an entity (or pages of an entity) recommendation system is already employed, for a defined period of time (e.g., 10 days, 30 days, 60 days, 6 months, etc.) the entities of the control group can be included when making recommendations regarding candidate entities through an entity recommendation user interface 340. In contrast to the control group of entities, the test group of entities will not be included in making entity recommendations to the users 102A-102N of the social networking system 130 for the defined period of time. In an embodiment where an entity/page recommendation system is not already employed, the roles of the control group and test group are reversed. In such embodiments, the control group of entities will continue not being used to make any entity recommendations to users, whereas the test group of entities are eligible to be included in an entity recommendation user interface 340 presented to the users 102A-102N of the social networking system 130 for the defined period of time.

At the conclusion of the defined period of time, the objective function dimensional impact determination module 402 will utilize the historic social networking system data 438 to analyze and determine the effect upon an objectively measurable benefit (e.g., entity engagement) within the social networking system 130 for each of the entities in both the control group and test group. The objectively measurable benefit within the social networking system 130 is defined by a configurable objective function 410.

In some embodiments, the objectively measureable benefit is "engagement-based" and thus the system seeks to maximize an amount of engagement that the entity has with the social networking system 130. In these embodiments, the configurable objective function 410 may be entity-centric and can be defined as a number of writes (e.g., posts, comments, pictures uploaded, videos uploaded, etc.), by an administrative user responsible for updating a page of the entity in the social networking system 130, to that page over a recent period of time. In some embodiments, the configurable objective function 410 is defined as a number of times, over a recent period of time, that the administrative user logged in to the social networking system 130, viewed the entity page, modified/updated the entity page, and/or performed an action on the entity page (e.g., clicked on a link, edited a post, etc.).

Instead of being entity-centric, the configurable objective function 410 may also, in whole or in part, be social network-centric and thereby focus upon the engagement of the rest of the social network with the entity and/or page of the entity. For example, the configurable objective function 410 could be based upon a number of entity page views by other users 102A-102N (i.e., not a user serving as an administrator or representative of the entity or the page of the entity) of the social networking system 130 over a recent period of time, a number of other users that "like" the entity, a number of other users that have formed some sort of connection (e.g., edge) to the entity in the social graph, a number of writes (e.g., posts, comments) to the entity page by other users 102A-102N of the social networking system 130 over a recent period of time, etc. Moreover, in some engagement-based configurations, both entity-centric and social network-centric measures can be used together as part of the configurable objective function 410; for example, in an embodiment the configurable objective function 410 is based upon a total number of reads and writes to an entity page by both administrative users of the entity page and other users 102A-102N of the social networking system 130 over a period of time.

The selection of which components of the configurable objective function 410, and the interrelationship between those components, is left to configuration, as operators of different social networking systems 130 may wish to focus upon increasing particular types of activity.

When a configurable objective function 410 is configured, a criteria for the configurable objective function 410 is also configured to indicate what minimum (or maximum) output score of the configurable objective function 410 is the threshold for determining if the entity is sufficiently "engaged." For example, in an embodiment where the configurable objective function 410 is defined as a total number of user and administrator writes to an entity page within a seven-day range, the criteria may be set at "5 writes" (or 10 writes, 100 writes, etc.). Thus, any entity having 5 or more writes within the time period (i.e., any entity having a configurable objective function 410 output score satisfying the criteria value) is deemed as "engaged." The selection of the exact criteria value is also configurable and in many embodiments is dependent upon the configurable objective function 410 selected and the type (and activity level) of social networking system 130 itself.

After the experiment to collect data for determining the statistical value of recommending connections to entities, the objective function dimensional impact determination module 402 generates an output score for each of the test group and control group entities based upon a view of data at the time of the conclusion of the experiment. Then, the output score of each entity is associated with a dimensional value of that entity, which is objectively determinable. For example, a dimensional value may be "a number of user likes" of the entity's page (i.e., connections in the social graph between the entity and users). In various embodiments, the dimensional value may be any objectively determinable value that assists in differentiating the different entities, and can include any of the components discussed above as possible candidates for the configurable objective function 410.

Conceptually, the determined configurable objective function 410 output scores (and/or Boolean values) and the dimensional value of each entity from both the test and control groups of entities are utilized, in an embodiment, to generate plot 420 and plot 422. Plot 420 indicates the percentage of entities in the test group having output scores satisfying the criteria value (the y-axis value), based upon the dimensional value (the x-axis value) of the entity. Similarly, plot 422 indicates the percentage of entities in the control group having output scores satisfying the criteria value (the y-axis value), based upon the dimensional value (the x-axis value) of the entity. In constructing the plot, common smoothing techniques well known to those of skill in the art (e.g., averaging) may be used to modify the data to generate a deterministic plot (e.g., curve, line, etc.), where exactly one data point (i.e., y-axis value) exists for each input value (i.e., x-axis value).

For example, in an embodiment the x-axis of each of plot 420 and plot 422 is a number of user "likes" of each entity, and the y-axis is the percentage of entities in the respective group (test or control) having a "number of user and administrator entity page writes" (configurable objective function 410 output score) exceeding 5 user writes in a week (the criteria value).

At this point, the objective function dimensional impact determination module 402 transfers 440 the plot (420, 422) information to the objective function dimensional impact delta module 404, which constructs an objective value model 119A based upon a computed difference between the test group plot 420 and the control group plot 422. In this illustrative example, the x-axis (e.g., input value of the objective value model 119A) remains a number of user "likes" for an entity, and the y-axis (e.g., the output score of the objective value model 119A) indicates an expected increase in entity engagement by being included when making recommendations to the users 102A-102N of the social networking system 130. Thus, the objective value model 119A, based upon input values (e.g., a number of "likes") of various entities, can determine which of those entities, if recommended to a user, will provide the largest predicted gain in entity engagement (e.g., largest gain in user and administrator entity page writes) within the social networking system 130. In this example, the objective value model 119A indicates that the predicted gain for the social networking system 130 is the largest for those entities having a smaller number of "likes", and the predicted gain rapidly becomes smaller as the number of "likes" becomes larger and larger. Thus, the objective value model 119A, in this example, will provide larger output scores (or "boosts") to those entities having a smaller number of user "likes" (i.e., having a smaller dimensional input value). In an embodiment, this constructed objective value model 119A is sent 444 to the objective value model module 320 for use.

In some embodiments, however, the objective value model 119A is sent 442 to a discretization module 406 and transformed into a discretized objective value model 119B. In the depicted embodiment, portions of the objective value model 119A are split, or discretized, into a number of buckets 426 (a configured number of buckets or an automatically generated number of buckets, which can be implemented using well-known machine learning techniques directed toward determining a number of clusters in a data set). Each bucket 426 of objective value model 119B values may be analyzed to determine a representative value for each bucket 426, which may include the use of a common statistical method such as taking an average, median, mode, etc. The representative values, in some embodiments, may be rounded, scaled such that the smallest such value is equal to 1.0, or transformed according to another well-known statistical technique. With the representative values, the discretization module 406 then creates and sends 444 the discretized objective value model 119B, which includes, for each bucket, both a range of dimensional values (e.g., ranges of user "likes" for an entity) and an associated representative value, which may be deemed as "multiplier" and used for weighting purposes.

As described earlier with respect to FIG. 3, some embodiments of the page recommendation processing module 120 include a plurality of objective value model generation modules 302A-302N that generate a plurality of objective value models 119 to be used by the objective value model module 320. In other embodiments, though, there is only one objective value model generation module 302A and one objective value model 119.

Figure 4B:
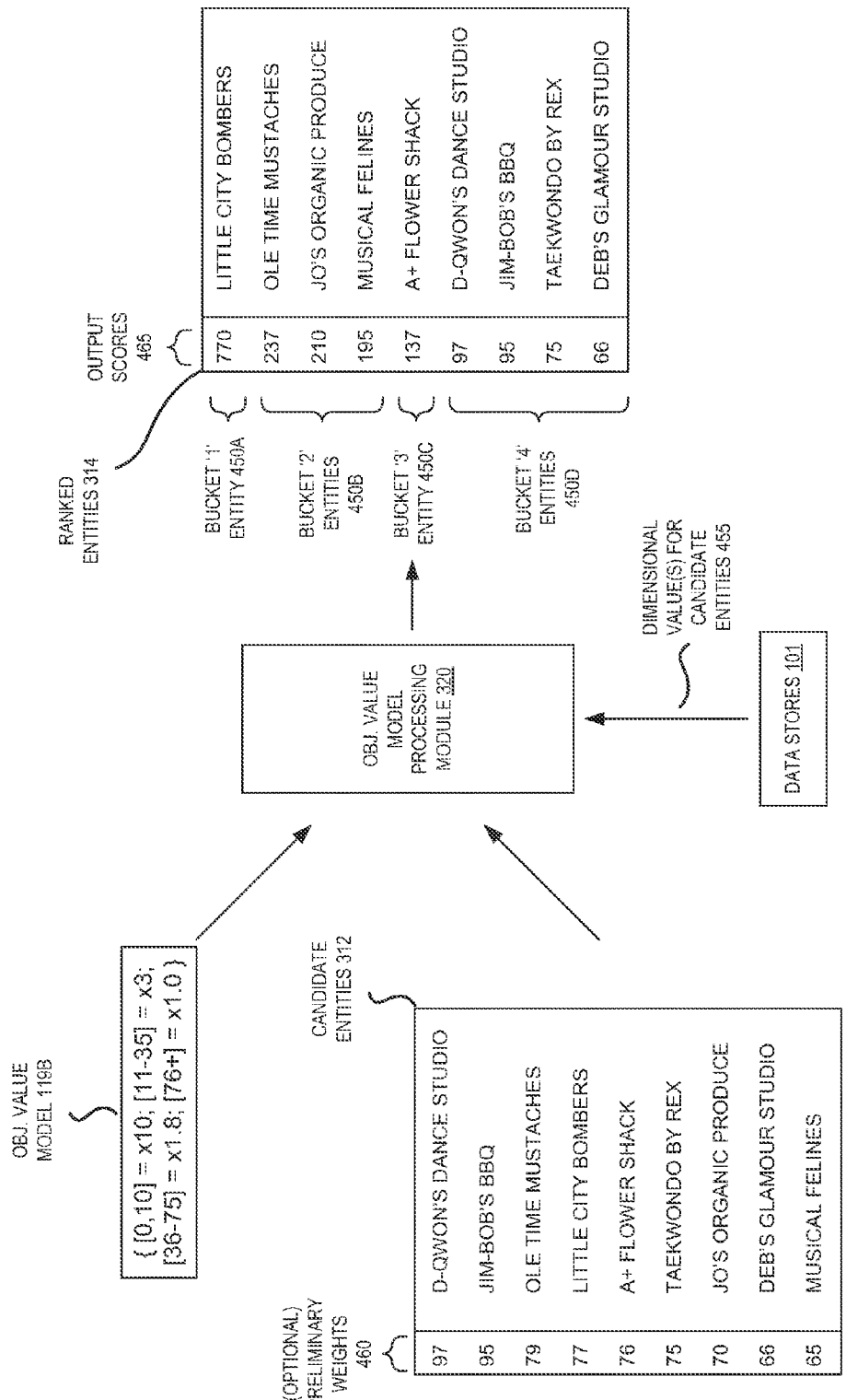
FIG. 4B illustrates a block diagram of a page recommendation processing module utilizing an objective value model with a set of candidate entities to generate a set of ranked entities according to an embodiment of the invention.

FIG. 4B illustrates a block diagram of a page recommendation processing module utilizing an objective value model with a set of candidate entities to generate a set of ranked entities according to an embodiment of the invention. As described and illustrated in FIG. 3, the objective value model application module 320 receives one or more objective value models 119 (which are typically not user-specific) and a set of candidate entities 312 (which typically are user-specific). In this illustrated embodiment, the objective value model 119B is discretized, such as the objective value model generated by the discretization module 406 in FIG. 4A, and includes four "buckets"—entities having 0 to 10 user "likes" have an associated multiplier of 10; entities having 11 to 35 user "likes" have an associated multiplier of 3, entities having 36 to 75 user "likes" have an associated multiplier of 1.8, and entities having 75 or more user "likes" have an associated multiplier of 1.0.

In this embodiment, the objective value model application module 320 also receives a set of candidate entities 312 as well as preliminary weights 460 for each of the candidate entities. In some embodiments, the preliminary weights 460 are the result of the preliminary weighting module 308 generating values indicating a "click through" likelihood that the user, if recommended a particular entity in the set of candidate entities 312, will perform an action with regard to that entity (click to see a page of the entity, "like" the entity, etc.).

With the objective value model 119B, the objective value model processing module 320 will receive the set of candidate entities 312 (typically generated for a particular user) and will apply the objective value model 119B by first gathering data representing the dimensional values 455 (objective value model 119B required input values) for the candidate entities from the data stores 101. For example, in an embodiment where the dimensional value is defined as a number of user "likes" of the entity page, the objective value model processing module 320 will access the social graph store 140 of the data stores 101 to determine how many different user nodes in the node store 142 have "like" connections (i.e., edges in edge store 144) to each entity's object node in the node store 142.

Upon acquiring the dimensional value for each candidate entity of the set of candidate entities 312, the objective value model processing module 320 will apply each dimensional value to the objective value model 119B to derive an output score 465 for each of the candidate entities 312. In an embodiment, the output score 465 includes only the output from the objective value model 119B for that entity; however, in other embodiments, the output score 465 is based upon the output from the objective value model 119B as one or more other values, including but not limited to each of the preliminary weights 460 (representing predicted click through likelihoods).

By way of example, in the illustrated embodiment of the invention, the output score 465 for each entity is set to a result of the output from the objective value model 119B multiplied by the preliminary weight 460 (although in other embodiments, other functions may be utilized that may or may not utilize the preliminary weights). Accordingly, as the preliminary weight of the entity "D-Qwon's Dance Studio" is "97" (indicating a high relative likelihood that the user will interact with the entity, if the entity is presented/suggested to the user), and upon determining the dimensional value 455 for this entity is "734" (indicating that the entity has 734 different users that "like" the entity), the output score 465 for the entity is computed to be the preliminary weight multiplied by the objective value model 119B output of "1.0" (since the input dimensional value is greater than "75"), resulting in an output score of "97". In comparison, while the preliminary weight 460 for "Little City Bombers" is only "77", it's dimensional value 455 of "6" places it in the first bucket 450A, which has a multiplier of "10" and thus an output score 465 of "770".

The candidate entities 312 and then sorted (ascending or descending) according to the output scores 465 to create a set of ranked entities 314.

Depending upon configuration, zero, one, or more of the ranked entities 314 are utilized by creating a recommendation module 345 for each ranked entity within an entity recommendation user interface 340 of the user 104A. In an embodiment, those entities at the top of the ranked entities 314 (having the largest output scores 465 are chosen and/or displayed first. Examples of recommendation modules 345 and entity recommendation user interfaces 340 are presented below with respect to FIG. 5 and FIG. 6.

Entity Recommendation User Interfaces

FIG. 5 illustrates entity recommendation user interfaces according to an embodiment of the invention. Entity recommendation user interface 340A comprises a "Pages You May Like" module, which includes a "See All" user input element allowing a user to view additional recommended entities, as well as multiple recommendation modules 345A-1 to 345A-5.

In this embodiment, the entity recommendation user interface 340A is configured to present to the user 102A the five top ranked entities 314 in recommendation module 314A-1, 314A-2, 314A-3, 314A-4, and 314A-5. Each recommendation module 345A includes an icon representing the entity (e.g., a logo, photograph, etc.), a name of the entity, a descriptive statement (e.g., "8 people like this", "Jane Doe likes this", "5 of your friends like this", etc.), and a "like" user interface element allowing a user 102A to "like" the entity and thereby create a link/edge between the user and the entity in the social graph of the social networking system 130. In embodiments of the invention, one or more of the icon, name, and descriptive statement are selectable (e.g., clickable) by the user 102A, which leads the social networking system 130 to present information about the selected entity to the user 102A. In an embodiment, upon a selection of an entity in a recommendation module (e.g., 345A-2), the social networking system 130 will present to the user an interface displaying a page of the entity (e.g., a page for "Old Time Mustaches").

A second entity recommendation user interface 340B is presented that includes one larger recommendation module 345B presenting information about the same entity depicted in recommendation module 345A-2 of entity recommendation user interface 340A. In this example, the recommendation module 345B includes a small icon of the entity, a name of the entity, a large graphic of the entity, a caption of the entity ("Handlebars! Imperial!"), a descriptive statement of the entity ("Rollie Eckersley, Dennis Fingers, and 14 of your other friends like this."), and a larger "like" user interface element allowing a user 102A to immediately "like" the entity.

In embodiments of the invention, the entity recommendation user interfaces 340A-340B may be presented to the user 102A simultaneously with other content from the social networking system 130, such as a "News Feed" of stories, or on an entity page or user page.

Figure 6:
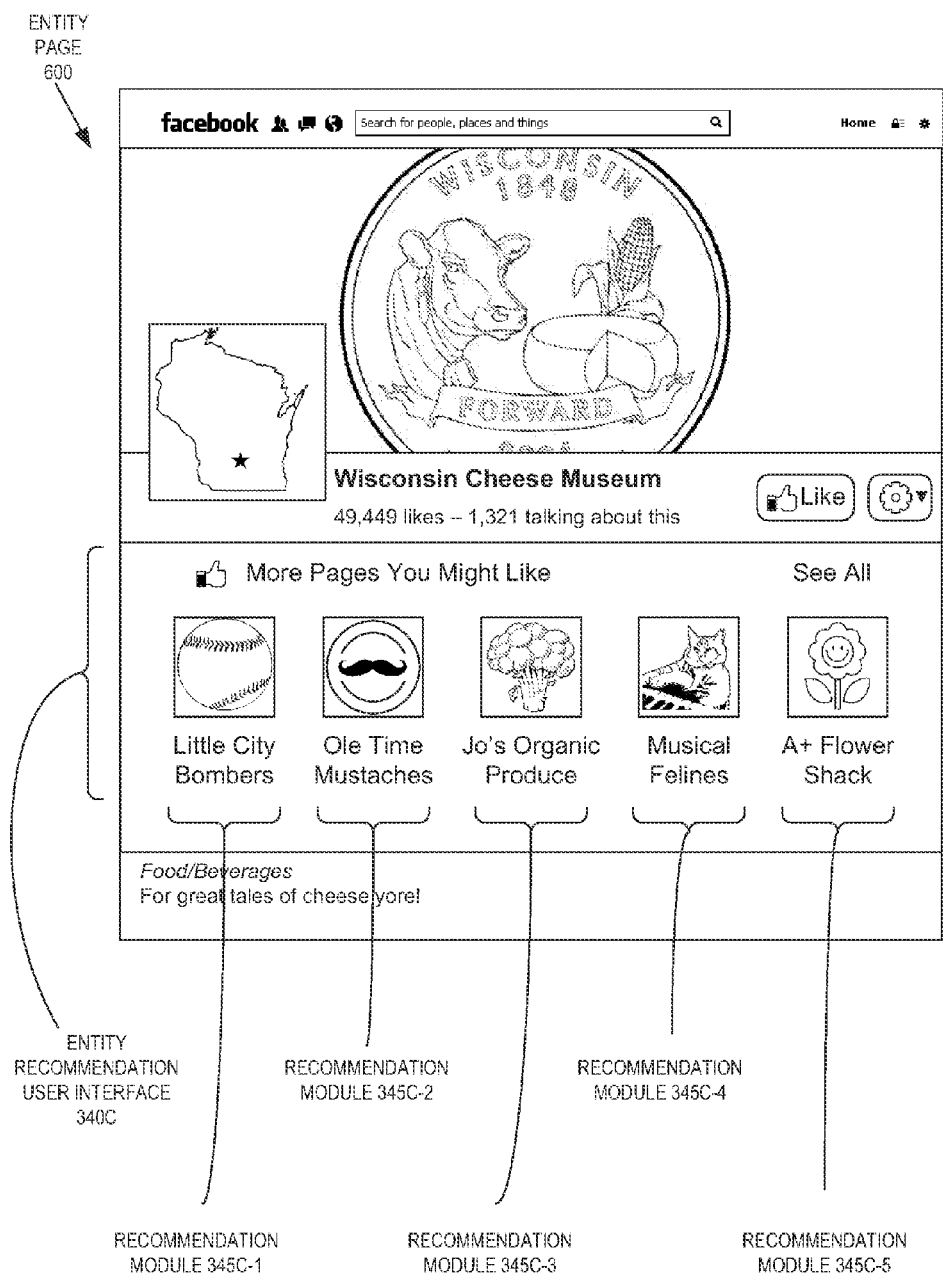
FIG. 6 illustrates an entity recommendation user interface within an entity page according to an embodiment of the invention.

FIG. 6 illustrates an entity recommendation user interface 340C within an entity page 600 according to an embodiment of the invention. In this depicted user interface, a user 102A is viewing an entity page 600 of a first entity ("Wisconsin Cheese Museum"), which includes a navigation bar (including a logo, a search user input element, and several icons), a large graphic associated with the first entity, a small icon associated with the first entity, the title of the first entity, and several other icons and descriptive statements. Next, the entity page 600 includes the entity recommendation user interface 340C, which in this depicted embodiment includes recommendation modules 345C-1 to 345C-5 for the top five entities of the set of ranked entities 314. In this embodiment, each recommendation module 345C includes only an icon of each recommended entity and a title of each recommended entity. In this embodiment, the user 102A may select the icon or the title, and upon such a selection the social networking system 130 will present a different entity page for the selected entity to the user 102A. After the entity recommendation user interface 340C, the rest of the entity page 600 for the first entity continues with category information, and other content such as posts, images, links, comments, etc.

Entity Recommendation Flow Utilizing Objective Value Models

Figure 7:
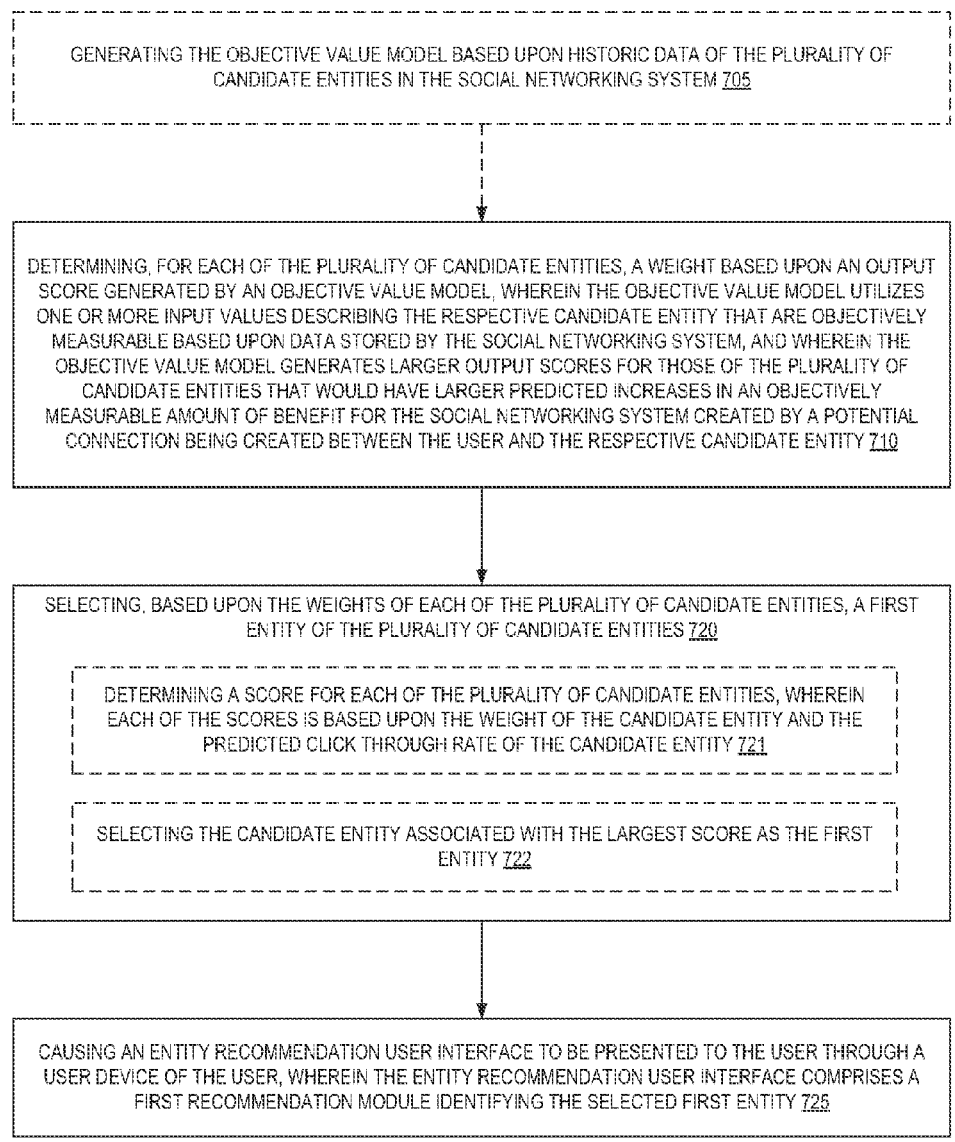
FIG. 7 illustrates a flow for optimally increasing a benefit to a social networking system by recommending pages of entities to users based upon an application of an objective value model to a plurality of candidate entities according to an embodiment of the invention.

FIG. 7 illustrates a flow 700 for optimally increasing a benefit to a social networking system by recommending pages of entities to users based upon an application of an objective value model to a plurality of candidate entities according to an embodiment of the invention. In one embodiment, the benefit is an increased engagement of the entity within the social networking system 130.

The depicted flow 700 optionally begins with step 705, which includes generating an objective value model based upon historic data of the plurality of candidate entities in the social networking system. In an embodiment, the historic data represents (or describes) the objectively measurable amount of benefit to the social networking system. The step 705 of generating may include running an experiment with a test group of entities and a control group of entities, where one of the groups is not included when recommending entities to users of the social networking system for a period of time, and then the effect upon an objectively measurable benefit within the social networking system for each of the entities in both the control group and test group is determined based upon a configurable objective function 410. This, in an embodiment of the invention, includes applying the configurable objective function to each of the entities to generate an output score, and determining how many of the output scores for each of the groups satisfies a criteria value. A difference between graphs of the percentages of each group's criteria-satisfaction rate is utilized as the objective value model, which in some embodiments is a continuous-type or semi-continuous model, and in other embodiments creates discrete output values based upon buckets.

At step 710, the flow 700 includes determining, for each of the plurality of candidate entities, a weight based upon an output score generated by an objective value model. The objective value model utilizes one or more input values describing the respective candidate entity that are objectively measurable based upon data stored by the social networking system. The objective value model generates larger output scores for those of the plurality of candidate entities that would create larger predicted increases in an objectively measurable amount of benefit (e.g., entity engagement) with the social networking system created by a potential connection being created between the user and the respective candidate entity.

At step 720, the flow 700 includes selecting, based upon the weights of each of the plurality of candidate entities, a first entity of the plurality of candidate entities. The selecting step 720 may, in an embodiment, include determining 721 a score for each of the plurality of candidate entities, wherein each of the scores is based upon the weight of the candidate entity and the predicted click through rate of the candidate entity. The selecting step 720 may, in an embodiment, include selecting 722 the candidate entity associated with the largest score as the first entity.

At step 725, the flow 700 includes causing an entity recommendation user interface to be presented to the user through a user device of the user. The entity recommendation user interface includes a first recommendation module identifying the selected first entity.

Alternative Object Value Models

Many embodiments of the invention discussed above are presented using increased entity "engagement" as the increased benefit to the social networking system 130 modeled by the objective value model(s) 119. For example, "engagement-based" objective value models 119 are presented above that create output scores (boost values) based upon a predicted maximization of an expected amount of entity engagement by recommending certain entities to users. However, other ways to model increased benefit are expressly contemplated. For example, an embodiment of the invention utilizes a "revenue based" objective value model 119 that creates output scores based upon a predicted maximization of an expected amount of revenue by recommending certain entities to users. In such an embodiment, the configurable objective function 410—which represents the objectively measurable benefit within the social networking system 130—may include one or more objectively measurable values including, but not limited to, an amount of advertising spending or advertising purchases made by the entity, an amount of advertising impressions in the social networking system 130 (e.g., related to the entity, displayed on the entity's page, etc.), an amount of total advertising in the social networking system 130, etc. However, the flexible nature of the described system allows for any configurable objective function 410 to be utilized to increase any benefit that can be objectively measured by the social networking system 130, such as increasing an amount of entity administrator usage of the social networking system 130, increasing an amount of any type (or all types) of user interaction in the social networking system 130, increases of page views for the entity or within the social networking system 130, or increases in measurable activity of actions related to the entities (e.g., users calling, emailing, messaging, or otherwise contacting the entity through (or using data from) the social networking system 130, users getting directions to an entity with a physical location, user check-ins with the entity, etc.).

Data Processing System Components

Figure 8:
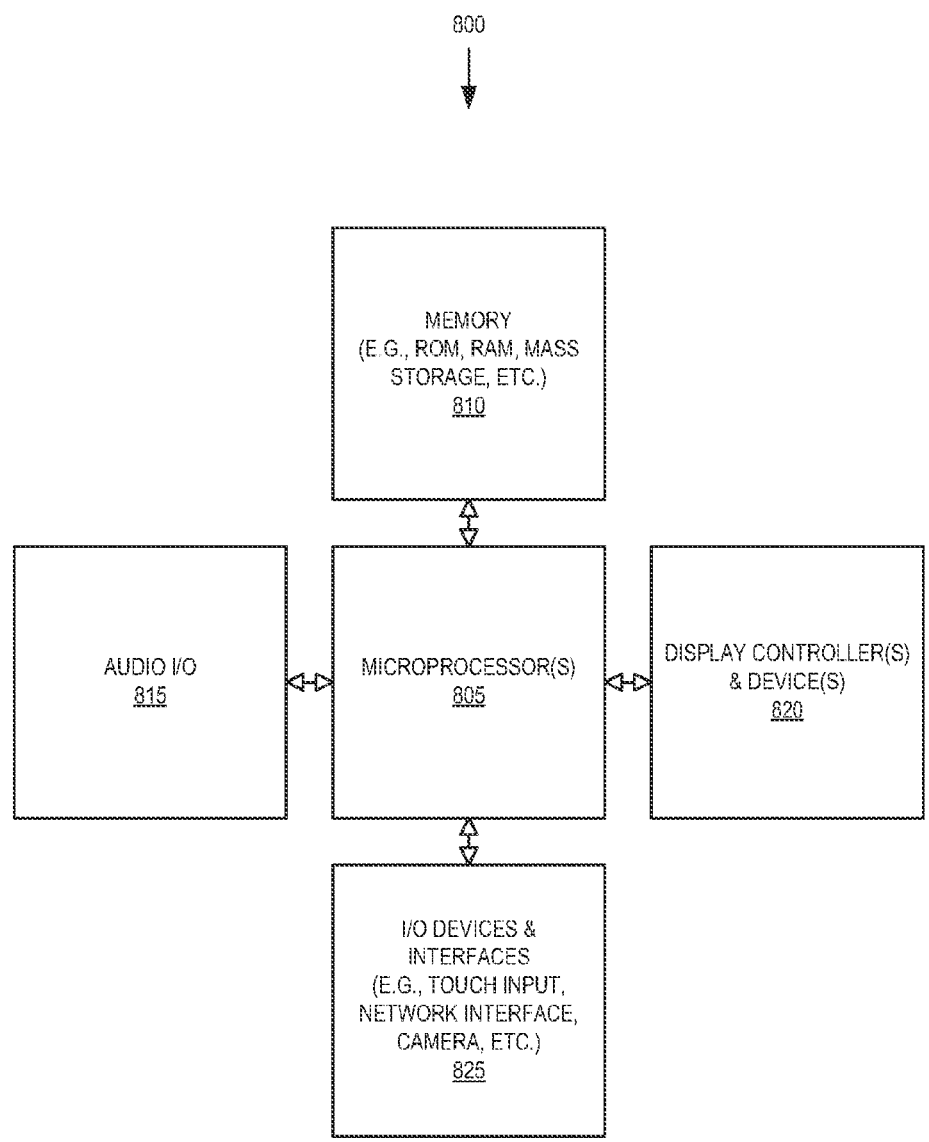
FIG. 8 illustrates a block diagram for an exemplary processing system to provide social network functionalities according to an embodiment of the invention.

FIG. 8 illustrates a block diagram for an exemplary data processing system 800 to provide social network functionalities according to an embodiment of the invention. Data processing system 800 includes one or more microprocessors 805 and connected system components (e.g., multiple connected chips). Alternatively, the data processing system 800 is a system on a chip. One or more such data processing systems 800 may be utilized to implement the functionality of the social networking system 130, user devices 104A-104N, and/or the external server 115, as illustrated in FIG. 1.

The data processing system 800 includes memory 810, which is coupled to the microprocessor(s) 805. The memory 810 may be used for storing data, metadata, and programs for execution by the microprocessor(s) 805. The memory 810 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 810 may be internal or distributed memory.

The data processing system 800 also includes an audio input/output subsystem 815 which may include a microphone and/or a speaker for, for example, playing back music or other audio, receiving voice instructions to be executed by the microprocessor(s) 805, playing audio notifications, etc. A display controller and display device 820 provides a visual user interface for the user, e.g., GUI windows.

The data processing system 800 also includes one or more input or output ("I/O") devices and interfaces 825, which are provided to allow a user to provide input to, receive output from, and otherwise transfer data to and from the system. These I/O devices 825 may include a mouse, keypad or a keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 800.

The I/O devices and interfaces 825 may also include a connector for a dock or a connector for a USB interface, FireWire, Thunderbolt, Ethernet, etc. to connect the system 800 with another device, external component, or a network. Exemplary I/O devices and interfaces 825 also include wireless transceivers, such as an IEEE 802.11 transceiver, an infrared transceiver, a Bluetooth transceiver, a wireless cellular telephony transceiver (e.g., 2G, 3G, 4G), or another wireless protocol to connect the data processing system 800 with another device, external component, or a network and receive stored instructions, data, tokens, etc. It will be appreciated that one or more buses may be used to interconnect the various components shown in FIG. 8.

The data processing system 800 is an exemplary representation of a user device (e.g., 104A), but any of these features may also be utilized by one or more devices implementing the social networking system 130. The data processing system 800 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, or devices which combine aspects or functions of these devices, such as a media player combined with a PDA and a cellular telephone in one device. In other embodiments, the data processing system 800 may be a network computer, server, or an embedded processing device within another device or consumer electronic product. As used herein, the terms computer, system, device, processing device, and "apparatus comprising a processing device" may be used interchangeably with the term data processing system 800 and include the above-listed exemplary embodiments.

It will be appreciated that additional components, not shown, may also be part of the system 800, and, in certain embodiments, fewer components than that shown in FIG. 8 may also be used in a data processing system 800. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 810 or other non-transitory machine-readable storage medium. The software may further be transmitted or received over a network (not shown) via a network interface device 825. In various embodiments, hardwired circuitry may be used in combination with the software instructions to implement the present embodiments. Thus, the techniques are not limited to any specific combination of hardware circuitry and software, or to any particular source for the instructions executed by the data processing system 800.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system including a network. Modules and components of hardware or software implementations can be divided or combined without significantly altering embodiments of the invention.

While these methods, systems, and user interfaces utilize both publicly available information as well as information provided by users of the social networking system, all use of such information is to be explicitly subject to all privacy settings of the involved users and the privacy policy of the social networking system as a whole. Additionally, while embodiments of the invention presented herein include video content having an audio track and a video track, in other embodiments these user interfaces, methods, and systems can be used with audio content without an associated video track, or with video content without an associated audio track.

In the foregoing description, numerous specific details are set forth. However, it is understood that embodiments of the invention may be practiced without these specific details. References in this specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the foregoing description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Additionally, the term "module" is used throughout the description and may refer to a hardware circuit and/or software stored in memory to be run on a processor. It should be noted that one or more modules may be combined or have their functionality further broken down.

Bracketed text and blocks with dashed borders (e.g., large dashes, small dashes, dot-dash, dots) are used herein to illustrate optional operations or components that add additional features to embodiments of the invention. However, such notation should not be taken to mean that these are the only options or optional operations, and/or that blocks with solid borders are not optional in certain embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A method, comprising:
    generating, by a computing device of a social networking system, a plurality of candidate entities within the social networking system for recommendation to a user of the social networking system, wherein a candidate entity is not a personal account of a user of the social networking system;
    determining, for each of the plurality of candidate entities, a weight based upon an output score generated by an objective value model, wherein the objective value model utilizes one or more input values describing the respective candidate entity that are objectively measurable based upon data stored by the social networking system, and wherein the objective value model generates larger output scores for those of the plurality of candidate entities that would create larger predicted increases in an objectively measurable amount of benefit for the social networking system created by a potential connection being created between the user and the respective candidate entity;
    selecting, based upon the weights of each of the plurality of candidate entities, a first entity of the plurality of candidate entities; and
    causing an entity recommendation user interface to be presented to the user through a user device of the user, wherein the entity recommendation user interface comprises a first recommendation module identifying the selected first entity.

2. The method of claim 1, wherein the first recommendation module further comprises a user interface input element that allows the user to visit a page of the first entity or create a connection to the first entity within a social graph of the social networking system.

3. The method of claim 1, wherein the one or more input values comprise a current number of users of the social networking system that are connected to the candidate entity in a social graph of the social networking system.

4. The method of claim 1, wherein the objectively measurable amount of benefit comprises an amount of interactions, by users of the social networking system, with the respective candidate entity within the social networking system.

5. The method of claim 4, wherein the interactions comprise one or more of:
    comments made by one or more of the users of the social networking system on a page of the respective candidate entity;
    page views made by the one or more of the users of the social networking system on the page of the respective candidate entity; and
    shares made by the one or more of the users of the social networking system of content from the page of the respective candidate entity with other of the users of the social networking system.

6. The method of claim 1, wherein the objectively measurable amount of benefit comprises one of:
    an amount of interactions, by an administrative user that manages a page of the respective candidate entity within the social networking system, with the page of the respective candidate entity; and
    an amount of advertising, requested by the administrative user that manages the page of the respective candidate entity within the social networking system, for the respective candidate entity within the social networking system.

7. The method of claim 1, further comprising:
    generating the objective value model based upon historic data of the plurality of candidate entities in the social networking system.

8. The method of claim 1, wherein said selecting is further based upon a predicted click through likelihood, wherein the predicted click through likelihood represents a likelihood that the user, if presented the recommendation module that identifies one of the plurality of candidate entities, will visit a page of that one of the plurality of candidate entities or create a connection to that one of the plurality of candidate entities within a social graph of the social networking system.

9. The method of claim 8, wherein said selecting comprises:
    determining a score for each of the plurality of candidate entities, wherein each of the scores is based upon the weight of the candidate entity and the predicted click through likelihood of the candidate entity; and
    selecting the candidate entity associated with the largest score as the first entity.

10. The method of claim 1, wherein the entity recommendation user interface is presented to the user through one of:
    a web browser executing on the user device; and
    a standalone social networking system application executing on the user device.

11. A non-transitory computer-readable storage medium storing instructions which, when executed by one or more processors in set of one or more processing devices, cause the set of processing devices to perform operations for a social networking system, the operations comprising:
    generating, by a computing device of a social networking system, a plurality of candidate entities within the social networking system for recommendation to a user of the social networking system, wherein a candidate entity is not a personal account of a user of the social networking system;

determining, for each of the plurality of candidate entities, a weight based upon an output score generated by an objective value model, wherein the objective value model utilizes one or more input values describing the respective candidate entity that are objectively measurable based upon data stored by the social networking system, and wherein the objective value model generates larger output scores for those of the plurality of candidate entities that would create larger predicted increases in an objectively measurable amount of benefit for the social networking system created by a potential connection being created between the user and the respective candidate entity;

selecting, based upon the weights of each of the plurality of candidate entities, a first entity of the plurality of candidate entities; and causing an entity recommendation user interface to be presented to the user through a user device of the user, wherein the entity recommendation user interface comprises a first recommendation module identifying the selected first entity.

12. The non-transitory computer-readable storage medium of claim 11, wherein the first recommendation module further comprises a user interface input element that allows the user to visit a page of the first entity or create a connection to the first entity within a social graph of the social networking system.

13. The non-transitory computer-readable storage medium of claim 11, wherein the one or more input values comprise a current number of users of the social networking system that are connected to the candidate entity in a social graph of the social networking system.

14. The non-transitory computer-readable storage medium of claim 11, wherein the objectively measurable amount of benefit comprises an amount of interactions, by users of the social networking system, with the respective candidate entity within the social networking system.

15. The non-transitory computer-readable storage medium of claim 14, wherein the interactions comprise one or more of:
    comments made by one or more of the users of the social networking system on a page of the respective candidate entity;
    page views made by the one or more of the users of the social networking system on the page of the respective candidate entity; and
    shares made by the one or more of the users of the social networking system of content from the page of the respective candidate entity with other of the users of the social networking system.

16. The non-transitory computer-readable storage medium of claim 11, wherein the objectively measurable amount of benefit comprises one of:
    an amount of interactions, by an administrative user that manages a page of the respective candidate entity within the social networking system, with the page of the respective candidate entity; and
    an amount of advertising, requested by the administrative user that manages the page of the respective candidate entity within the social networking system, for the respective candidate entity within the social networking system.

17. The non-transitory computer-readable storage medium of claim 11, further comprising:
    generating the objective value model based upon historic data of the plurality of candidate entities in the social networking system.

18. The non-transitory computer-readable storage medium of claim 11, wherein said selecting is further based upon a predicted click through likelihood, wherein the predicted click through likelihood represents a likelihood that the user, if presented the recommendation module that identifies one of the plurality of candidate entities, will visit a page of that one of the plurality of candidate entities or create a connection to that one of the plurality of candidate entities within a social graph of the social networking system.

19. The non-transitory computer-readable storage medium of claim 18, wherein said selecting comprises:
    determining a score for each of the plurality of candidate entities, wherein each of the scores is based upon the weight of the candidate entity and the predicted click through likelihood of the candidate entity; and
    selecting the candidate entity associated with the largest score as the first entity.

20. The non-transitory computer-readable storage medium of claim 11, wherein the entity recommendation user interface is presented to the user through one of:
    a web browser executing on the user device; and
    a standalone social networking system application executing on the user device.

* * * * *